(No Model.) 3 Sheets—Sheet 2.
S. H. SHORT.
ELECTRIC LOCOMOTIVE.
No. 478,477. Patented July 5, 1892.
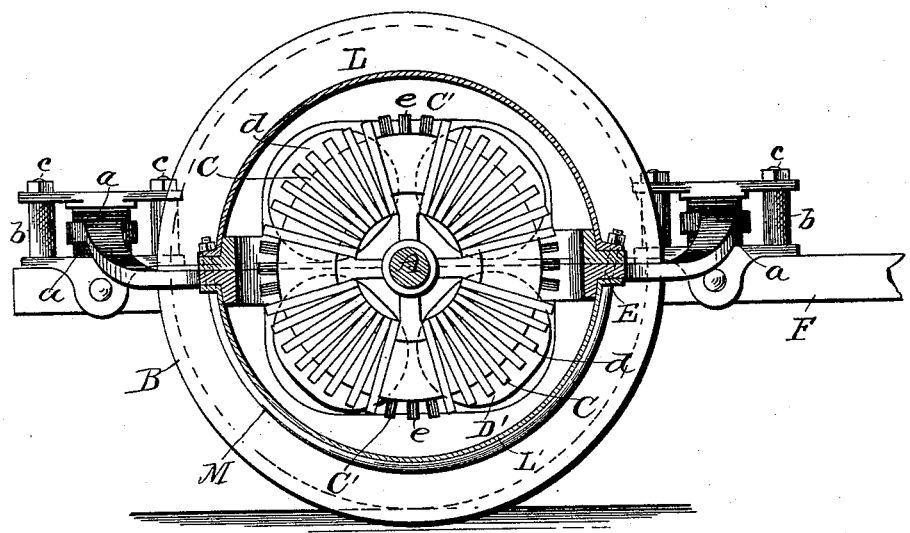
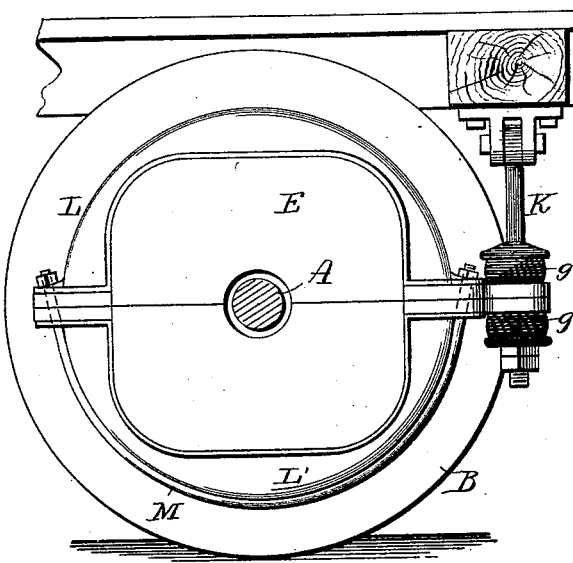
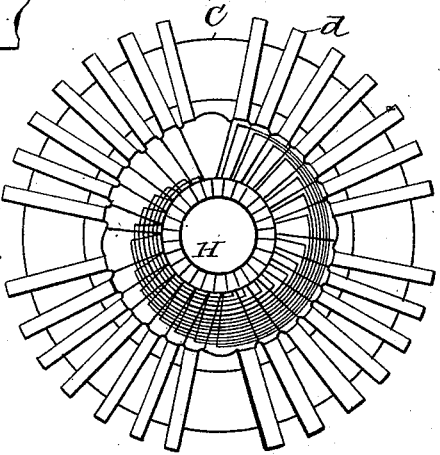
Witnesses
Inventor
Sidney H. Short
By H. A. Seymour
Attorney (No Model.)  3 Sheets—Sheet 3.
S. H. SHORT.
ELECTRIC LOCOMOTIVE.
No. 478,477.  Patented July 5, 1892.
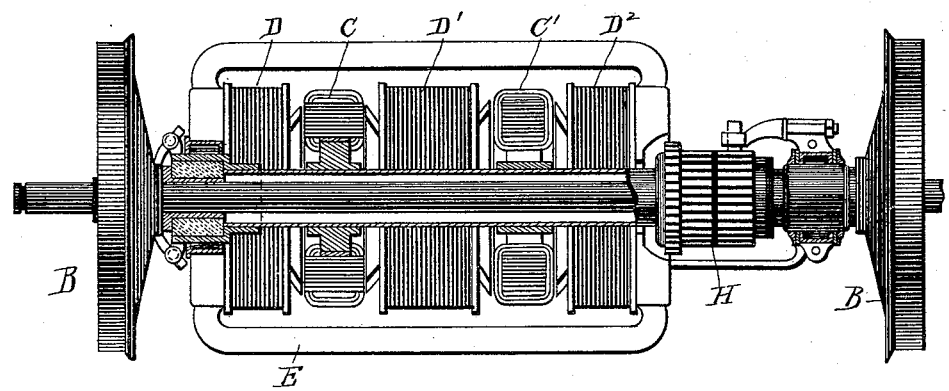
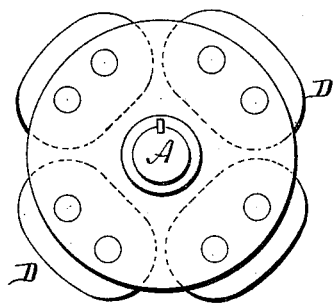
Witnesses
C. H. Nottingham
G. F. Downing
Inventor
Sidney H. Short
By H. A. Seymour
Attorney
THE NORRIS PETERS CO., PHOTO-LITHO., WASHINGTON, D. C.

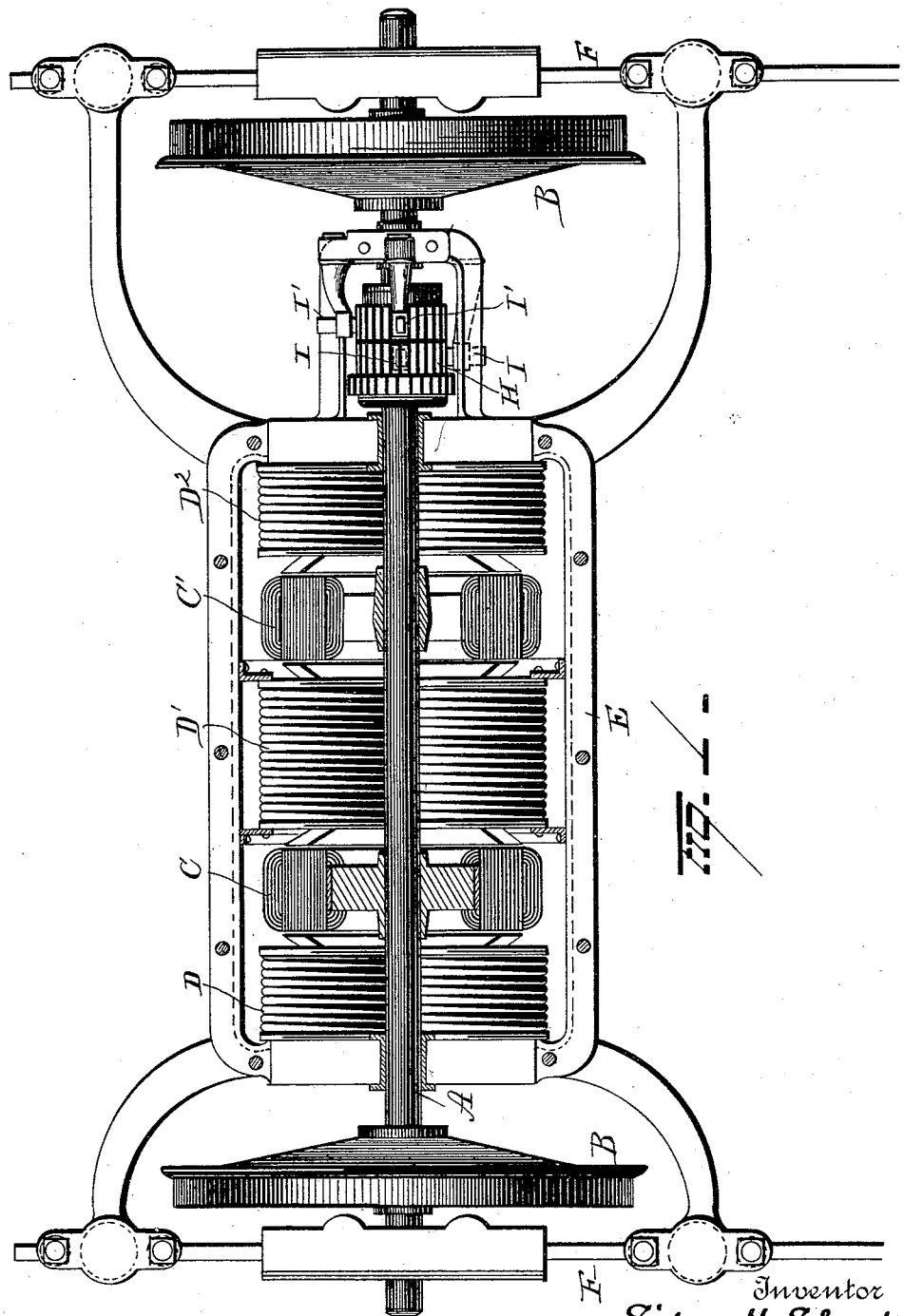

UNITED STATES PATENT OFFICE.

SIDNEY H. SHORT, OF CLEVELAND, OHIO.

ELECTRIC LOCOMOTIVE.

SPECIFICATION forming part of Letters Patent No. 478,477, dated July 5, 1892.

Application filed May 26, 1891. Serial No. 394,161. (No model.)

*To all whom it may concern:*

Be it known that I, SIDNEY H. SHORT, of Cleveland, in the county of Cuyahoga and State of Ohio, have invented certain new and useful Improvements in Electric Locomotives for Street-Cars and other Vehicles; and I do hereby declare the following to be a full, clear, and exact description of the invention, such as will enable others skilled in the art to which it appertains to make and use the same.

My invention relates to an improvement in electric locomotives for street-cars and other vehicles.

The object of the invention is to combine an electric motor with the axle of a street-car or other vehicle, and thereby transmit the power of the motor directly to the axle, and thus obviate the noise and wear attending the employment of intermediate gearing.

A further object is to combine with the axle of a car or other vehicle an electric motor of such construction as to transmit a practically constant propelling action to the axle.

With these objects in view the invention consists, first, in the combination, with the axle of a car or other vehicle, of an electric motor comprising two or more armatures having their bobbins relatively arranged so as to impart practically continuous propelling action to the car or vehicle.

The invention further consists in the combination, with the axle of a car or vehicle, of two or more armatures mounted on the axle and field-magnets arranged axially with reference to the axle.

The invention further consists in the combination, with the axle of a car or other vehicle, of two or more armatures mounted on the axle and field-magnets arranged axially with reference to the axle, one of said field-magnets being common to two of the armatures.

The invention further consists in certain other novel features of construction and combinations of parts, as will be hereinafter described, and pointed out in the claims.

In the accompanying drawings, Figure 1 is a plan view of the under side of a car-truck having one embodiment of my invention applied thereto. Fig. 2 is a transverse section of the same. Fig. 3 is a diagrammatic view of one of the armatures to illustrate its winding. Fig. 4 is an end view. Figs. 5 and 6 are modifications.

A represents a car-axle, and B B are car-wheels rigidly secured thereto. To the axle are rigidly secured the armatures C C', which may be of any approved construction and wound in any desired manner.

D D' D² are multipolar field-magnets arranged to encircle the axle and supported by a frame E, the opposite ends of which are mounted upon side bars F, which are seated upon the car-axle boxes G, whereby the field-magnets are retained under all circumstances at a fixed distance from the axle. The ends of the frame E are preferably insulated from the side bars by means of the india-rubber buffers $a$ and washers $b$ on the bolts $c$. This yielding connection not only serves to insulate the field-magnets from the truck-frame, but also serves to cushion them against any sudden or dangerous shocks. Each one of the armatures C C' is preferably wound with four series of bobbins, as set forth in my application, Serial No. 370,035, though I do not limit my invention to such method of winding. The bobbins $d$ on armature C are preferably arranged to alternate with bobbins $e$ on armature C', so that while the bobbins $d$ are at their points of low or least efficiency the bobbins $e$ will be at their points relatively high or greatest efficiency. By arranging the bobbins in the manner described there is insured a practically continuous and uniform application of power to the axle, whereby I am enabled to readily start the axle from any position of rest it may have assumed, and this arrangement of bobbins maintains a constant and uniform propelling movement to the car or other vehicle to which the motor is applied. The field-magnet D' is common to both armatures C C', and hence the complete motor with its two armatures may be disposed in compact space.

H represents the commutator, which is mounted upon the axle, and I I' are commutator-brushes, which are arranged at an angle of ninety degrees.

The field-magnet frame E is divided horizontally, its two halves being fastened together by bolts. The frame E is supported and retained against rotation by the suspension links or bolts K, which pass through the frame or truss-bars E. A slight yielding movement may be afforded the field-magnet frame E by india-rubber buffers g, interposed between the heads of the bolts and frame, or the yielding buffers or washers may be interposed between the frame and metal washer on the bolts.

The motor is protected from dust and water by a sheet-metal covering which is formed of upper and lower removable sections L L'. The motor is further protected by the guard-rods M, extending beneath the under side of the motor and which would serve to protect it against injury should the car or vehicle jump the track or in the event the axle should be broken.

Instead of securing the armature and commutator directly to the axle, they may be fastened to a sleeve loosely mounted on the axle, and the sleeve may be provided with arms arranged to engage arms formed on the inner sides of the car-wheels, and thus rotate the same. Again, instead of rotating the armatures they may be held stationary, and the field-magnets may be arranged to rotate and be secured to the axle or to a sleeve mounted thereon.

I do not restrict myself to the particular construction and arrangement of parts shown and described, as it is evident that many changes in the form and relative arrangement of parts might be resorted to without departing from my invention.

What I claim as new, and desire to secure by Letters Patent, is—

1. The combination, with the axle of a car or other vehicle, of field-magnets and two or more armatures arranged axially with reference to the axle, the bobbins on said armatures being relatively arranged so as to intersect or alternate one with the other, substantially as set forth.

2. The combination, with an electric motor encircling the axle of a car or other vehicle, of a series of guard-bars extending beneath the motor and serving to protect the same from injury, substantially as set forth.

In testimony whereof I have signed this specification in the presence of two subscribing witnesses.

SIDNEY H. SHORT.

Witnesses:
A. B. CALHOUN,
C. J. LEEPHART.